Nov. 3, 1936.　　　W. H. FRANK　　　2,059,988
ELECTRICAL DISTRIBUTION SYSTEM
Filed July 13, 1935　　2 Sheets-Sheet 2

INVENTOR.
William H. Frank
BY Daniel S. Cullen
ATTORNEY.

Patented Nov. 3, 1936

2,059,988

UNITED STATES PATENT OFFICE 2,059,988

ELECTRICAL DISTRIBUTION SYSTEM

William H. Frank, Detroit, Mich.

Application July 13, 1935, Serial No. 31,296

5 Claims. (Cl. 247—3)

This application relates to electrical distribution systems.

The inventions of the present application relate to novel details of bus bar insulating and supporting means and these details can best be understood in connection with the appended drawings. In these drawings, Figs. 1 and 2 are sectional views of a bus duct showing alternative arrangements of bus bar insulators of the flat base type;

Figure 1:
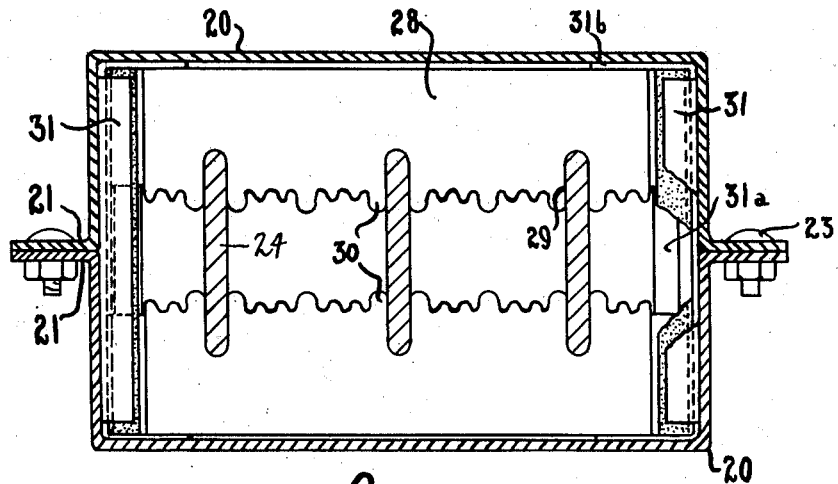
Figure 2:
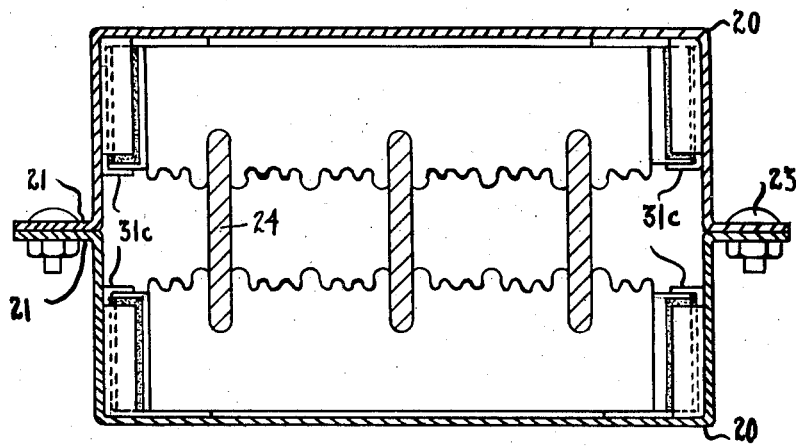
Figure 3:
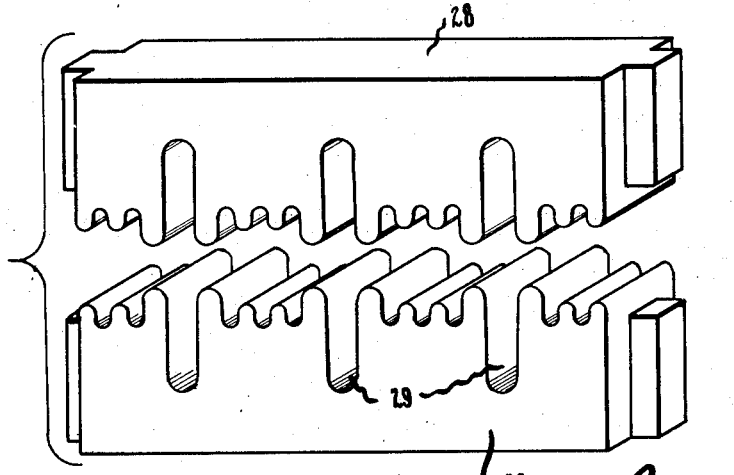
Fig. 3 shows the insulators per se.
Figure 4:
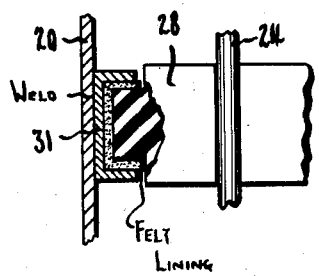
Fig. 4 is a plan section view of a detail showing an insulator received in a guide secured to a duct wall.

Referring to Figs. 1 and 2, it will be seen that these figures show, in a bus duct section, two similar or identical sheet metal casing halves 20 of substantially equal length and having cooperating longitudinal edge flanges 21 through holes of which may be passed casing-joining bolts 23.

Inside the metal casing formed by the juxtaposition of the halves are bus bars 24. These are supported by the insulator and supporting means forming the inventions of this application.

In Figs. 1 and 2, the bus bars are shown as being supported in the casing by flat-base-type vitreous insulators 28 which are identical for economy of manufacture. Two insulators comprise a supporting set, and each has in one edge slots 29 which cooperate to receive upper and lower edges of the bus bars. The insulators are supported in the casing by felt-lined channeled metal guides 31 spot-welded to the casing halves.

Figures 5, 6:
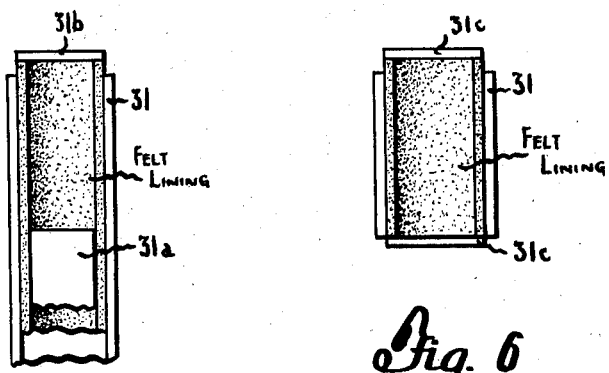
Figs. 5 and 6 show the alternative arrangements of Figs. 1 and 2 respectively, for supporting the insulators in the duct, in elevation.

Figures 1 and 5 show all the guides as being secured to the lower casing half. The assembly of a section of this character therefor is as follows: After the guides 31 are welded in place in the lower casing half, the lower ones of the insulators 28 are placed therein, with their side edges received within the channel guides, and with their slots 29 opening upwardly; then the bus bars are placed on the insulators, with their lower edges in the slots 29; then spacers 31a are placed in the guides to space the lower insulators from the upper insulators 28 which then are placed in the guides with their slots opening downwardly to receive the upper edges of the bus bars; then a lip portion 31b of each guide is bent down to overlie the upper edges of the upper insulators 28 and clamp the parts in place. The assembly is completed by placing the upper section half upon the lower section half and properly fastening the section halves to each other by means of the bolts 23 in the holes 22.

Figures 2 and 6 show the guides as being secured to the two section halves. The assembly of this construction may be effected as follows: Each section half is provided with its guides, and in each guide is positioned an insulator 28, the guides having lips 31c, which are turned down to hold the insulators in place. Bus bars are laid in the slots 29 of the insulators in one section half, and then the other section half, with its insulators, is laid over the upper edges of the bus bars so positioned, after which the assembly may be completed in the usual manner.

Now having described novel details and arrangements of bus bar insulator and supporting means, reference will be had to the following claims which determine the scope of the inventions of this application.

What I claim is:

1. In a duct for electrical distribution systems, complementary casing sections joined longitudinally by detachable joining means to form a readily divisible casing, similar and complementary insulator plates carried by one section of the casing, each plate having slots therein opening to an edge thereof, these edges being adjacent when the casing sections are joined so that the slots face each other and receive opposite edges of conductors, the aforementioned casing section and the complementary insulator plates and the conductors between them forming a unitary assembly to which a bare complementary casing section may be applied to form a complete duct.

2. In a duct for electrical distribution systems, channel-shaped casing sections joined longitudinally by detachable joining means on a plane substantially midway between the top and bottom walls of the duct to form a readily divisible casing, similar and complementary insulator plates carried by the casing sections, each plate having slots therein opening to an edge thereof, these edges being adjacent when the casing sections are joined so that the slots face each other and receive opposite edges of conductors.

3. In a duct for electrical distribution systems, complementary casing sections joined longitudinally by detachable joining means to form a readily divisible casing, similar and complementary insulator plates carried by each section of the casing, each plate having slots therein opening to an edge thereof, these edges being adjacent when the casing sections are assembled so that the slots face each other and receive opposite edges of conductors, each casing section and its insulator plates forming a unitary assembly similar to that formed by a complementary casing section and its insulator plates.

4. In a duct for electrical distribution systems, complementary channel shaped casing sections joined longitudinally by detachable joining means on a plane substantially midway between the top and bottom walls of the duct to form a readily divisible casing, similar and complementary insulator plates carried by one section of the casing, each plate having slots therein opening to an edge thereof, these edges being adjacent when the casing sections are joined so that the slots face each other and receive opposite edges of conductors, the aforementioned casing section and the complementary insulator plates and the conductors between them forming a unitary assembly to which a bare complementary casing section may be applied to form a complete duct.

5. In a duct for electrical distribution systems, complementary channel shaped casing sections joined longitudinally by detachable joining means on a plane substantially midway between the top and bottom walls of the duct to form a readily divisible casing, similar and complementary insulator plates carried by each section of the casing, each plate having slots therein opening to an edge thereof, these edges being adjacent when the casing sections are assembled so that the slots face each other and receive opposite edges of conductors, each casing section and its insulator plates forming a unitary assembly similar to that formed by a complementary casing section and its insulator plates.

WILLIAM H. FRANK.

DISCLAIMER 2,059,988.—*William H. Frank*, Detroit, Mich. ELECTRICAL DISTRIBUTION SYSTEM. Patent dated November 3, 1936. Disclaimer filed March 15, 1943, by the assignee, *Bulldog Electric Products Co.*

Hereby disclaims claim 1 of said patent.

[*Official Gazette April 6, 1943.*]